United States Patent
Uka et al.

(10) Patent No.: US 10,319,532 B2
(45) Date of Patent: Jun. 11, 2019

(54) ELECTROLYTIC CAPACITOR

(71) Applicant: Panasonic Intellectual Property Management Co., Ltd., Osaka (JP)

(72) Inventors: Youichirou Uka, Hyogo (JP); Takafumi Sakida, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/812,380

(22) Filed: Nov. 14, 2017

(65) Prior Publication Data

US 2018/0068802 A1    Mar. 8, 2018

Related U.S. Application Data

(63) Continuation of application No. PCT/JP2016/001810, filed on Mar. 23, 2016.

(30) Foreign Application Priority Data

May 29, 2015  (JP) .................................. 2015-109339

(51) Int. Cl.
*H01G 9/028* (2006.01)
*H01G 9/042* (2006.01)
(Continued)

(52) U.S. Cl.
CPC ............. *H01G 9/028* (2013.01); *H01B 1/124* (2013.01); *H01G 9/0036* (2013.01);
(Continued)

(58) Field of Classification Search
CPC ........ H01G 9/028; H01G 9/0036; H01G 11/48; H01G 11/56; H01G 9/042; H01G 9/15; H01G 11/52; H01B 1/124
See application file for complete search history.

(56) References Cited

U.S. PATENT DOCUMENTS 9,287,055 B2 * 3/2016 Kato ..................... H01G 9/07
2010/0165546 A1   7/2010 Yoshida et al.
(Continued)

FOREIGN PATENT DOCUMENTS

CN    103305000 A    9/2013
JP    2008-109065    5/2008
(Continued)

OTHER PUBLICATIONS

International Search Report of PCT application No. PCT/JP2016/001810 dated Jun. 21, 2016.
(Continued)

*Primary Examiner* — Dion Ferguson
(74) *Attorney, Agent, or Firm* — McDermott Will & Emery LLP

(57) ABSTRACT

An electrolytic capacitor includes: an anode body; a dielectric layer formed on the anode body; a first conductive polymer layer covering at least a part of the dielectric layer; and a second conductive polymer layer covering at least a part of the first conductive polymer layer. The first conductive polymer layer includes a first conductive polymer and a first dopant. The second conductive polymer layer includes a second conductive polymer, a second dopant and a polycarboxylic acid.

19 Claims, 1 Drawing Sheet

(51) Int. Cl.
  *H01G 9/15* (2006.01)
  *H01B 1/12* (2006.01)
  *H01G 9/00* (2006.01)
  *H01G 11/48* (2013.01)
  *H01G 11/56* (2013.01)
  *H01G 11/52* (2013.01)
(52) U.S. Cl.
  CPC .............. *H01G 11/48* (2013.01); *H01G 11/56* (2013.01); *H01G 9/042* (2013.01); *H01G 9/15* (2013.01); *H01G 11/52* (2013.01)

(56) References Cited

U.S. PATENT DOCUMENTS

| | | | |
|---|---|---|---|
| 2013/0236636 A1 | 9/2013 | Nobuta et al. | |
| 2014/0078645 A1* | 3/2014 | Sugihara | H01G 9/0036 361/523 |
| 2016/0343511 A1* | 11/2016 | Wakatsuki | H01G 9/15 |
| 2017/0338046 A1* | 11/2017 | Petrzilek | H01G 9/0029 |

FOREIGN PATENT DOCUMENTS

| | | |
|---|---|---|
| JP | 2012-124239 | 6/2012 |
| JP | 2013-185031 | 9/2013 |
| JP | 2014-201633 | 10/2014 |

OTHER PUBLICATIONS

English Translation of Chinese Search Report dated Sep. 6, 2018 for the related Chinese Patent Application No. 201680030231.4.

* cited by examiner

ELECTROLYTIC CAPACITOR

RELATED APPLICATIONS

This application is a continuation of the PCT International Application No. PCT/JP2016/001810, filed on Mar. 29, 2016, which claims the benefit of foreign priority of Japanese patent application No. 2015-109339, filed on May 29, 2015, the contents all of which are incorporated herein by reference.

BACKGROUND

1. Technical Field

The present disclosure relates to an electrolytic capacitor having a conductive polymer layer.

2. Description of the Related Art

As small-sized, large capacitance, and low equivalent series resistance (ESR) capacitors, promising candidates are electrolytic capacitors including an anode body on which a dielectric layer is formed and a conductive polymer layer formed so as to cover at least a part of the dielectric layer. The conductive polymer layer includes a π-conjugated polymer, and a dopant such as polyanion. With use of the dopant, conductivity is further imparted to the π-conjugated polymer.

An attempt has been made to improve performance by adding additives to the conductive polymer layer. For example, Unexamined Japanese Patent Publication No. 2008-109065 suggests formation of a conductive polymer layer including a π-conjugated conductive polymer, a polyanion, an ion-conductive compound, and a conductivity improver.

SUMMARY

An electrolytic capacitor according to one aspect of the present disclosure includes an anode body; a dielectric layer formed on the anode body; a first conductive polymer layer covering at least a part of the dielectric layer; and a second conductive polymer layer covering at least a part of the first conductive polymer layer. The first conductive polymer layer includes a first conductive polymer and a first dopant. The second conductive polymer layer includes a second conductive polymer, a second dopant and a polycarboxylic acid.

According to the present disclosure, it is possible to reduce ESR and to suppress a leakage current in an electrolytic capacitor having a conductive polymer layer.

DETAILED DESCRIPTION OF EMBODIMENT

When a conductivity improver or the like is added to a conductive polymer layer, conductivity can be improved, but a leakage current cannot be sufficiently suppressed in some cases.

The present disclosure provides a technique capable of reducing ESR and suppressing a leakage current in an electrolytic capacitor having a conductive polymer layer.

<Electrolytic Capacitor>

An electrolytic capacitor according to an exemplary embodiment of the present disclosure includes an anode body, a dielectric layer formed on the anode body, a first conductive polymer layer covering at least a part of the dielectric layer, and a second conductive polymer layer covering at least a part of the first conductive polymer layer. The first conductive polymer layer includes a first conductive polymer and a first dopant. The second conductive polymer layer includes a second conductive polymer, a second dopant and a polycarboxylic acid.

Generally, comparing the first conductive polymer layer formed on a surface of the dielectric layer and the second conductive polymer layer formed on a surface of the first conductive polymer layer, properties required for the first conductive polymer layer and for the second conductive polymer are different from each other, and properties required for a treatment liquid for formation of the first conductive polymer layer and for a treatment liquid for formation of the second conductive polymer are different from each other. In this exemplary embodiment, it has been found that addition of a polycarboxylic acid to the second conductive polymer layer can reduce ESR and suppress a leakage current for some unknown reasons. Generally, when the electrolytic capacitor is exposed to a high-temperature and high-humidity environment, or exposed to a high-humidity environment for a long time, a component of the anode body is eluted, leading to generation of a gas. The generated gas causes delamination at an interface between cathode layers, so that ESR increases, resulting in deterioration of performance of the capacitor. In contrast, in this exemplary embodiment, the eluted component of the anode body is caught by the polycarboxylic acid included in the second conductive polymer layer, so that deterioration of capacitor performance can be suppressed.

Figure 1:
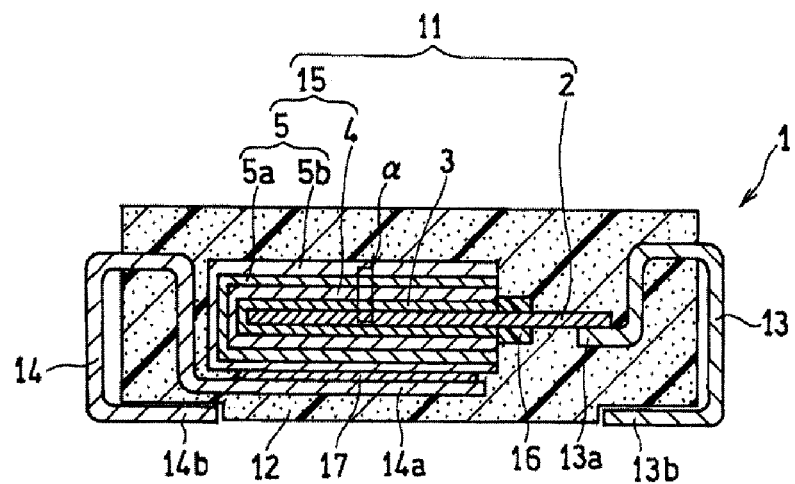
FIG. 1 is a schematic sectional view illustrating an electrolytic capacitor according to one exemplary embodiment of the present disclosure.
Figure 2:
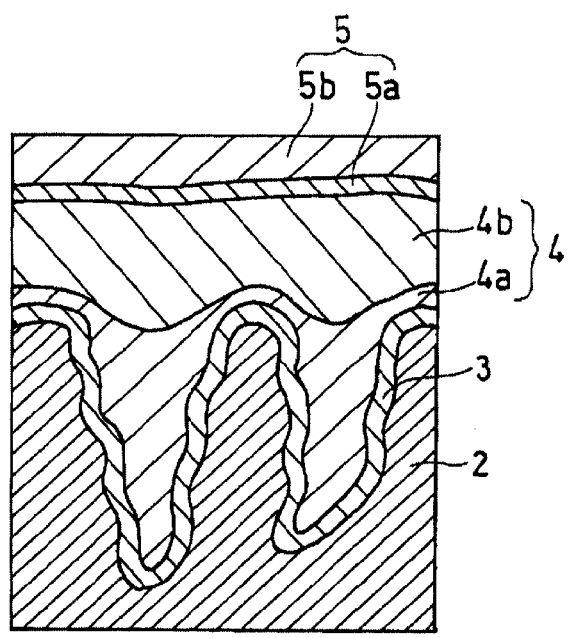
FIG. 2 is an enlarged view illustrating an area surrounded by a solid line a in FIG. 1.

FIG. 1 is a schematic sectional view illustrating an electrolytic capacitor according to one exemplary embodiment of the present disclosure. FIG. 2 is an enlarged view illustrating an area surrounded by a solid line a in FIG. 1. Electrolytic capacitor 1 includes capacitor element 11, resin outer packing 12 that seals capacitor element 11, and anode terminal 13 and cathode terminal 14 that are exposed to the outside of resin outer packing 12. Capacitor element 11 includes foil-like or plate-like anode body 2, dielectric layer 3 covering anode body 2, and cathode portion 15 covering dielectric layer 3.

Anode terminal 13 is electrically connected to anode body 2, and cathode terminal 14 is electrically connected to cathode portion 15. Resin outer packing 12 has an almost rectangular parallelepiped outer shape, and therefore electrolytic capacitor 1 also has an almost rectangular parallelepiped outer shape.

Anode body 2 and cathode portion 15 are opposite to each other with dielectric layer 3 interposed between anode body 2 and cathode portion 15. Cathode portion 15 includes conductive polymer layer 4 covering dielectric layer 3 and cathode layer 5 covering conductive polymer layer 4. Cathode layer 5 shown in the drawings has a two-layer structure, and includes carbon layer 5a in contact with conductive polymer layer 4 and silver paste layer 5b covering a surface of carbon layer 5a.

Anode body 2 has an area on which insulating separation part 16 is formed so as to zonally cover a surface of anode body 2, the area being in an end of anode body 2 that protrudes from cathode portion 15 and being adjacent to cathode portion 15. Thus a contact between cathode portion 15 and anode body 2 is restricted at the area. The end of anode body 2 that protrudes from cathode portion 15 is electrically connected to first end 13a of anode terminal 13 by welding or the like. Meanwhile, cathode layer 5 formed as an outermost layer of cathode portion 15 is electrically connected to first end 14a of cathode terminal 14 via a conductive adhesive material 17 (e.g., a mixture of a thermosetting resin and metal particles). Second end 13b of anode terminal 13 and second end 14b of cathode terminal 14 are drawn out from side surfaces of resin outer packing 12 which are different from each other, respectively. And second end 13b of anode terminal 13 and second end 14b of cathode terminal 14 each extend to one main flat surface (lower surface in FIG. 1) in an exposed state. The exposed parts of the terminals (anode terminal 13 and cathode terminal 14) on the flat surface are used for, for example, solder connections to a substrate (not shown in the drawings) on which electrolytic capacitor 1 is to be mounted.

Dielectric layer 3 is formed on a part of a surface of a conductive material constituting anode body 2. Specifically, dielectric layer 3 can be formed by anodizing the surface of the conductive material constituting anode body 2. Accordingly, dielectric layer 3 is formed along a surface (including an inner wall surface of pores or pits of an inner surface) of anode body 2 as shown in FIG. 2.

First conductive polymer layer 4a is formed so as to cover dielectric layer 3, and second conductive polymer layer 4b is formed so as to cover first conductive polymer layer 4a. However, a structure of the conductive polymer layer is not particularly limited as long as the electrolytic capacitor has the first conductive polymer layer and the second conductive polymer layer, and each of the conductive polymer layers may have a multi-layer structure with two or more layers. First conductive polymer layer 4a does not necessarily cover whole (a whole surface of) dielectric layer 3 and is satisfactory as long as first conductive polymer layer 4a is formed so as to cover at least a part of dielectric layer 3. Similarly, second conductive polymer layer 4b does not necessarily cover whole (a whole surface of) first conductive polymer layer 4a and is satisfactory as long as second conductive polymer layer 4b is formed so as to cover at least a part of first conductive polymer layer 4a. In the example shown in the drawing, first conductive polymer layer 4a and second conductive polymer layer 4b are shown as conductive polymer layer 4. In general, a layer including a conductive polymer, such as first conductive polymer layer 4a, second conductive polymer layer 4b, and conductive polymer layer 4, may be referred to as a solid electrolyte layer.

Dielectric layer 3 is formed along the surface of anode body 2, and therefore irregularities are formed on a surface of dielectric layer 3 in accordance with a shape of the surface of anode body 2. First conductive polymer layer 4a is preferred to be formed so as to fill such irregularities of dielectric layer 3.

Hereinafter, a configuration of the electrolytic capacitor is described in more detail.
(Anode Body)

A conductive material having a large surface area can be used as the anode body. Examples of the anode body include one obtained by roughening a surface of a base material (e.g., a foil-like or plate-like base material) formed of a conductive material, and a molded body that is prepared from particles of a conductive material or a sintered body obtained by sintering the molded body.

Examples of the conductive material may include a valve metal, an alloy including a valve metal, and a compound including a valve metal. These materials can be used alone or in combination of two or more materials. As the valve metal, there can be preferably used, for example, titanium, tantalum, aluminum and/or niobium. These metals are suitable as a constituent material of the anode body because oxides of these metals have a high dielectric constant.

When the electrolytic capacitor is exposed to a high-temperature and high-humidity environment, or exposed to a high-humidity environment for a long period of time, a component of the anode body may be eluted, leading to deterioration of performance of the electrolytic capacitor. Particularly, when the anode body includes aluminum, the aluminum is easily eluted. In this exemplary embodiment, the second conductive polymer layer includes a polycarboxylic acid, and therefore even if a component of the anode body is eluted, the eluted component is caught by the polycarboxylic acid, so that deterioration of performance of the electrolytic capacitor can be suppressed.

Thus, even when a material of the anode body is aluminum or an aluminum alloy, such performance deterioration can be suppressed.
(Dielectric Layer)

The dielectric layer is formed by anodizing, through an anodizing treatment or the like, a conductive material on the surface of the anode body, and therefore the dielectric layer includes an oxide of the conductive material (particularly, a valve metal). For example, when tantalum is used as the valve metal, the dielectric layer includes $Ta_2O_5$, and when aluminum is used as the valve metal, the dielectric layer includes $Al_2O_3$. The dielectric layer is not limited to these examples, and a layer is acceptable as the dielectric layer as long as the layer functions as a dielectric body. When the anode body is a foil-like or plate-like anode body, and a surface of the anode body is roughened, the dielectric layer is formed along an inner wall surface of pores or pits at a surface of anode body 2 as shown in FIG. 2.
(First Conductive Polymer Layer and Second Conductive Polymer Layer)

The first conductive polymer layer includes a conductive polymer (first conductive polymer) and a dopant (first dopant). The first conductive polymer layer includes a conductive polymer (second conductive polymer) and a dopant (second dopant). The dopant may be included in each of the layers in a state in which the conductive polymer is doped with the dopant. The dopant may also be included in each of the layers in a state in which the dopant is bonded to the conductive polymer.
(Conductive Polymer)

As each of the first conductive polymer and the second conductive polymer, a publicly known polymer, e.g., a π-conjugated conductive polymer, used for an electrolytic capacitor, can be used. Examples of such a conductive polymer include polymers having, as a basic skeleton, for example, polypyrrole, polythiophene, polyfuran, polyaniline, polyacetylene, polyphenylene, polyphenylene vinylene, polyacene, and/or polythiophene vinylene.

Such a polymer includes a homopolymer, a copolymer of two or more kinds of monomers, and derivatives (e.g., a substitute having a substituent) of these polymers. For example, polythiophene includes poly(3,4-ethylenedioxythiophene) and the like. Such a conductive polymer has high conductivity and an excellent ESR characteristic. These conductive polymers may be used alone or in combination of two or more conductive polymers. A weight average molecular weight of the conductive polymer is not particularly limited, and ranges, for example, from 1,000 to 1,000,000, inclusive.

The conductive polymer can be obtained by, for example, polymerizing a raw material of the conductive polymer (a precursor of the conductive polymer). The conductive polymer that is bonded to or doped with the dopant can be obtained by polymerizing a raw material of the conductive polymer in the presence of the dopant. Examples of the precursor of the conductive polymer may include a monomer that constitutes the conductive polymer and/or an oligomer in which some monomers are linked to each other. As a polymerization method, both chemical oxidation polymerization and electrolytic oxidation polymerization can be employed.

The polymerization may be performed in the presence of a catalyst for accelerating the polymerization. As the catalyst, ferrous sulfate, ferric sulfate or the like can be used. In chemical oxidation polymerization, for example, an oxidant such as a persulfate (e.g. ammonium persulfate, sodium persulfate or potassium persulfate), or a metal sulfonate may be used. The polymerization may be performed in the presence of a dopant as required.

For the polymerization, a solvent (first solvent) for dissolving or dispersing a raw material of the conductive polymer (and a dopant) may be used as required. Examples of the first solvent include water, a water-soluble organic solvent, and a mixture of water and a water-soluble organic solvent. The conductive polymer may be synthesized in advance before attached to the anode body including the dielectric layer. In the case of chemical oxidation polymerization, the polymerization of the conductive polymer may be performed in the presence of an anode body including a dielectric layer.

(Dopant)

Examples of the dopant (first dopant) included in the first conductive polymer layer and the dopant (second dopant) included in the second conductive polymer layer include low-molecular-weight dopants and polymer dopants. Each of the first conductive polymer layer and the second conductive polymer layer may include one dopant, or two or more dopants.

As the low-molecular-weight dopant, there can be used a compound (low-molecular-weight compound (monomer compound)) having an anionic group such as a sulfonate group, a carboxy group, a phosphate group (—O—P(=O)(—OH)$_2$), and/or a phosphonate group (—P(=O)(—OH)$_2$). Examples of the above-mentioned compound include cyclic compounds in which an anionic group is bonded to an aromatic ring (e.g. a $C_{6-14}$ aromatic ring) of benzene, naphthalene, anthracene or the like, or to a fused ring of an aromatic ring (e.g. a $C_{6-14}$ aromatic ring) and an aliphatic ring. As the anionic group, a sulfonate group is preferred, and a combination of the sulfonate group with an anionic group other than the sulfonate group is also acceptable. The aromatic ring and/or aliphatic ring constituting the cyclic compound may also include a substituent (e.g. an alkyl group such as a methyl group, and an oxo group (=O)), other than the anionic group. Specific examples of such a compound include benzenesulfonic acid, alkylbenzenesulfonic acids such as p-toluenesulfonic acid, naphthalenesulfonic acid, and anthraquinonesulfonic acid.

As the polymer dopant, for example, a polymer compound having an anionic group such as a sulfonate group, a carboxylate group, a phosphate group (—O—P(=O)(—OH)$_2$), and/or a phosphonate group (—P(=O)(—OH)$_2$) can be used. As the polymer dopant, one having a sulfonate group is preferable, and one having a sulfonated group, and an anionic group other than a sulfonate group, and/or a hydroxy group may be used.

Examples of the polymer dopant having a sulfonate group may include a homopolymer of a monomer having a sulfonate group (first monomer), a copolymer of the first monomer with another monomer (second monomer), a sulfonated phenolic resin (a sulfonated phenolic novolak resin, etc), and the like. Examples of the first monomer may include vinylsulfonic acid, allylsulfonic acid, 2-acrylamido-2-methylprop anesulfonic acid, styrenesulfonic acid, and isoprenesulfonic acid. Among these first monomers, it is preferred to use at least an aromatic vinyl monomer having a sulfonate group, such as styrenesulfonic acid. As the second monomer, a monomer not having an anionic group (vinyl monomer or the like) and the like can be used, but a monomer having an anionic group other than a sulfonate group (vinyl monomer or the like) is preferably used. The anionic group is, for example, at least one selected from the group consisting of a carboxy group, a phosphate group, and a phosphonate group.

Also, the polymer dopant is preferably a polyester having a sulfonate group, or the like. Examples of the polyester having a sulfonate group include polyesters including, as the first monomer, a polycarboxylic acid (dicarboxylic acid or the like) having a sulfonate group and/or a polyol (diol or the like) having a sulfonate group, and, as the second monomer, a polycarboxylic acid (dicarboxylic acid or the like) and a polyol (diol or the like). As the first monomer, a polycarboxylic acid having a sulfonate group is preferably used. As the polycarboxylic acid having a sulfonate group, dicarboxylic acids (aromatic dicarboxylic acid and the like) having a sulfonate group, such as sulfonated phthalic acid, sulfonated isophthalic acid, and sulfonated terephthalic acid, are preferred. As the polycarboxylic acid as the second monomer, a polycarboxylic acid not having a sulfonate group is used, and dicarboxylic acids (aromatic dicarboxylic acid and the like), such as phthalic acid, isophthalic acid, and terephthalic acid, are preferred. As the polyol as the second monomer, a polyol not having a sulfonate group is used, and aliphatic diols ($C_{2-4}$ alkylene glycol and the like), such as ethylene glycol and propylene glycol, are preferred.

In the polymer dopant, the first monomer and the second monomer may each be used alone or in combination of two or more monomers. A sulfonation degree of the polymer dopant can be appropriately selected from, for example, a wide range from 5 mol % to 100 mol %, inclusive.

The term sulfonation degree of the polymer dopant in the present specification means a proportion (mol %) of a repeating unit having a sulfonate group (including a salt or ester of the sulfonate group) in whole repeating units constituting a molecule of the polymer dopant. The polymer dopant may have two or more sulfonate groups (including a salt or ester of the sulfonate group) per repeating unit; however, it preferably has one sulfonate group (including a salt or ester of the sulfonate group) per repeating unit.

The first conductive polymer layer and the second conductive polymer layer may each include a plurality of dopants that are mutually different in sulfonation degree and/or type (or structure).

The first dopant included in the first conductive polymer layer includes a first polymer dopant having sulfonation degree $S_1$, and the second dopant included in the second conductive polymer layer includes a second polymer dopant having sulfonation degree $S_2$. Here, sulfonation degree $S_1$ and sulfonation degree $S_2$ satisfy $S_2 < S_1$. The second conductive polymer layer includes the second polymer dopant having a relatively low sulfonation degree, so that moisture resistance can be improved. The first conductive polymer layer includes the first polymer dopant having a relatively high sulfonation degree, so that dispersibility of the dopant is enhanced, and a high carrier concentration is easily secured, thus making it easy to reduce ESR.

Preferably, sulfonation degree $S_1$ of the first polymer dopant is preferably 45 mol % or more (e.g. from 45 mol % to 100 mol %, inclusive), and may be from 70 mol % to 100 mol %, inclusive. When sulfonation degree $S_1$ falls within such a range, dispersibility of the dopant (and the conductive polymer) in the first conductive polymer layer is easily enhanced, and conductivity is easily further improved. When a plurality of first polymer dopants having different sulfonation degrees are used, each of the plurality of first polymer dopants preferably has a sulfonation degree falling within the above-mentioned range of $S_1$.

Sulfonation degree $S_2$ of the second polymer dopant is, for example, 55 mol % or less, preferably from 5 mol % to 55 mol %, inclusive, and may be from 10 mol % to 30 mol %, inclusive. When sulfonation degree $S_2$ falls within such a range, moisture resistance of the second conductive polymer layer can be further improved. When the plurality of second polymer dopants having different sulfonation degrees are used, each of the plurality of second polymer dopants preferably has a sulfonation degree falling within the above-mentioned range of $S_2$.

A difference between sulfonation degree $S_1$ and sulfonation degree $S_2$ ($S_1-S_2$) is, for example, 25 mol % or more, preferably from 30 mol % to 90 mol %, inclusive. When this difference falls within such a range, it is easy to have a balance of high moisture resistance and high capacity and/or low ESR.

The first polymer dopant includes at least one selected from the group consisting of a polymer dopant A having sulfonation degree $S_{1a}$ and a polymer dopant B having sulfonation degree $S_{1b}$. Here, sulfonation degrees $S_{1a}$ and $S_{1b}$ satisfy $S_{1b}<S_{1a}$. Sulfonation degree $S_{1a}$ is, for example, 90 mol % or more, preferably from 95 mol % to 100 mol %, inclusive. Sulfonation degree $S_{1b}$ is, for example, 45 mol % or more and less than 90 mol %, preferably 50 mol % or more and less than 90 mol %, or from 45 mol % to 85 mol %, inclusive. The first conductive polymer layer may include one or both of polymer dopant A and polymer dopant B.

Polymer dopant A is preferably a homopolymer or a copolymer of the first monomer, a sulfonated phenol resin or the like, especially preferably a homopolymer or a copolymer of the first monomer. As the polymeric dopant A, in particular, an aromatic vinyl polymer having a sulfonate group, for example, a homopolymer of an aromatic vinyl monomer having a sulfonate group and a copolymer of an aromatic vinyl monomer having a sulfonate group with another monomer having a sulfonate group (e.g., aliphatic vinyl monomer having a sulfonate group, and/or a diene monomer having a sulfonate group), are preferred.

First polymer dopant B is preferably a copolymer of the first monomer and the second monomer. As the polymer dopant B, in particular, a copolymer including a first monomer unit (aromatic vinyl monomer unit having a sulfonate group or the like), and a monomer unit having an anionic group other than a sulfonate group, and/or a hydroxy group (vinyl monomer unit or the like) is preferred.

As the second polymer dopant, a copolymer of the first monomer and the second monomer is preferred. As the second polymer dopant, a polyester having a sulfonate group is preferably used because such a polyester is easily dispersed in a treatment liquid for formation of the conductive polymer layer.

In the dopant or a monomer that forms the polymer dopant, the anionic group such as a sulfonate group or a carboxy group is not particularly limited as long as the anionic group can generate an anion in a dissociated state, and the anionic group may be a salt or ester of the above-mentioned anionic group.

Each of weight average molecular weights of the first polymer dopant and the second polymer dopant is, for example, from 1,000 to 1,000,000, inclusive. Use of the polymer dopant having such a molecular weight further facilitates homogenization of the conductive polymer layer.

A ratio of the dopant included in the first conductive polymer layer is preferably from 10 parts by mass to 1,000 parts by mass, inclusive, with respect to 100 parts by mass of the first conductive polymer. A ratio of the dopant included in the second conductive polymer layer is preferably from 10 parts by mass to 1,000 parts by mass, inclusive, with respect to 100 parts by mass of the second conductive polymer.

(Polycarboxylic Acid)

In this exemplary embodiment, it is important that the second conductive polymer layer includes a polycarboxylic acid. When the second conductive polymer layer includes a polycarboxylic acid, ESR can be reduced, and a leakage current can be suppressed. Such an effect is low when only the first conductive polymer layer includes a polycarboxylic acid. Particularly, it is difficult to obtain a sufficient effect of suppressing a leakage current.

For suppressing a leakage current and improving a voltage resistance characteristic, it is preferable that the polymer dopant having a hydroxy group, or a polyhydroxy compound as described later is locally present in the second conductive polymer layer, and is not present, or is present at a low concentration in the first conductive polymer layer. The polycarboxylic acid is capable of further reducing a leakage current by crosslinking these components having a hydroxy group. From such a viewpoint, it is preferable that the second conductive polymer layer includes a polycarboxylic acid.

The polycarboxylic acid may be included in at least the second conductive polymer layer, or included in both the first conductive polymer layer and the second conductive polymer layer. For example, a ratio of the polycarboxylic acid included in the first conductive polymer layer is preferably 500 parts by mass or less with respect to 100 parts by mass of the first conductive polymer.

However, it is preferable that the first conductive polymer layer does not include a polycarboxylic acid, or when the first conductive polymer includes a polycarboxylic acid, a concentration of the polycarboxylic acid included in the second conductive polymer layer is higher than a concentration of the polycarboxylic acid included in the first conductive polymer layer. For example, the ratio of the polycarboxylic acid included in the first conductive polymer layer is preferably 100 parts by mass or less (e.g. from 10 parts by mass to 100 parts by mass, inclusive), and may be from 10 parts by mass to 20 parts by mass, inclusive, with respect to 100 parts by mass of the first conductive polymer. When the ratio of the polycarboxylic acid included in the first conductive polymer layer falls within such a range, a high effect of reducing ESR in an initial stage and during a reliability test is obtained. Concentrations of the polycarboxylic acid in the layers may be compared based on relative amounts of the polycarboxylic acid with respect to the conductive polymer.

A ratio of the polycarboxylic acid included in the second conductive polymer layer is, for example, from 5 parts by mass to 500 parts by mass, inclusive, preferably from 10 parts by mass to 200 parts by mass, inclusive, with respect to 100 parts by mass of the second conductive polymer layer. When the ratio of the polycarboxylic acid included in the second conductive polymer layer falls within such a range, the effect of reducing ESR is further improved, and a leakage current can be more effectively suppressed. For further improving the effect of suppressing a leakage current, the ratio of the polycarboxylic acid included in the second conductive polymer layer may be from 30 parts by mass to 100 parts by mass, inclusive, with respect to 100 parts by mass of the second conductive polymer layer.

Examples of the polycarboxylic acid may include aromatic polycarboxylic acids, cycloaliphatic polycarboxylic acids, and aliphatic polycarboxylic acids. The polycarboxylic acids include polycarboxylic acids containing hetero atoms such as a N atom, a S atom and an oxygen atom in moieties other than a carboxy group. The polycarboxylic acids also include acid anhydrides of the polycarboxylic acid. The acid anhydride may be any of a compound in which an acid anhydride group is intramolecularly formed in a molecule, and a compound in which an acid anhydride group is intermolecularly formed.

The polycarboxylic acid may be one having a hydroxy group and/or an anionic group (second anionic group) other than a carboxy group (first anionic group). The anionic group other than a carboxy group may be, for example, a sulfonate group, a phosphate group and/or the phosphonate group. A total number of hydroxy groups and second anionic groups in the polycarboxylic acid is, for example, 1 to 6, preferably 1 to 4 or 1 to 3.

Thus, as the polycarboxylic acid, a low-molecular-weight compound having a plurality of carboxy groups can be used. The low-molecular-weight compounds include, in addition to monomer compounds, acid anhydrides in which an acid anhydride group is intermolecularly formed among a plurality of polycarboxylic acid molecules. The polycarboxylic acids may be used alone or in combination of two or more polycarboxylic acids.

A number of carboxy groups in the polycarboxylic acid should be 2 or more, and may be 2 to 6 or 2 to 4. For more easily obtaining an effect of reducing ESR and an effect of suppressing a leakage current, the number of carboxy groups in the polycarboxylic acid is preferably 3 or more, more preferably 3 to 6, or 3 or 4. When the polycarboxylic acid has an acid anhydride group, the number of carboxy groups in the polycarboxylic acid is twice as large as a number of acid anhydride groups.

For example, the aromatic carboxylic acid is preferably an aromatic dicarboxylic acid such as phthalic acid, isophthalic acid, terephthalic acid, naphthalene dicarboxylic acid, 5-sulfoisophthalic acid, 5-hydroxyisophthalic acid, or phthalic anhydride; an aromatic tricarboxylic acid such as trimesic acid, trimellitic acid, or trimellitic anhydride; or an aromatic tetracarboxylic acid such as pyromellitic acid, pyromellitic anhydride, biphenyltetracarboxylic acid, biphenyltetracarboxylic dianhydride, 4,4'-oxydiphthalic acid, 4,4'-oxydiphthalic dianhydride, benzophenonetetracarboxylic acid, or benzophenonetetracarboxylic dianhydride.

For example, the cycloaliphatic polycarboxylic acid is preferably a saturated cycloaliphatic polycarboxylic acid such as 1,4-cyclohexanedicarboxylic acid, hexahydrophthalic acid, or an anhydride of such an acid; an unsaturated cycloaliphatic polycarboxylic acid such as tetrahydrophthalic acid or an anhydride of such an acid, or methyltetrahydrophthalic acid or an anhydride of such an acid; or the like. A cycloaliphatic ring of the cycloaliphatic polycarboxylic acid is preferably a fifth-membered ring to eighth-membered ring, more preferably fifth-membered ring or sixth-membered ring.

Examples of the aliphatic polycarboxylic acid may include saturated aliphatic polycarboxylic acids and unsaturated aliphatic polycarboxylic acids. The aliphatic polycarboxylic acid is preferably a dicarboxylic acid, a tricarboxylic acid, a tetracarboxylic acid, or the like. Examples of the unsaturated aliphatic polycarboxylic acid include maleic acid, maleic anhydride, fumaric acid, itaconic acid, citraconic acid, and glutaconic acid.

Examples of the saturated aliphatic dicarboxylic acid include malonic acid, succinic acid, succinic anhydride, 1,4-butanedicarboxylic acid, adipic acid, tartaric acid, D-glucaric acid, and saturated aliphatic dicarboxylic acids including a hetero atom in moieties other than a carboxy group. Examples of the saturated aliphatic dicarboxylic acid including an O atom as a hetero atom may include diglycolic acid and oxydibutyric acid. Examples of the saturated aliphatic dicarboxylic acid including a S atom as a hetero atom may include thiodiacetic acid and thiodibutyric acid. Examples of the saturated aliphatic dicarboxylic acid including a N atom as a hetero atom may include iminodiacetic acid and iminobutyric acid.

Examples of the saturated aliphatic tricarboxylic acid include tricarballylic acid and citric acid. Examples of the saturated aliphatic tetracarboxylic acid include 1,2,3,4-butanetetracarboxylic acids and anhydrides of such acids.

In the polycarboxylic acid, the anionic group such as a carboxy group is not particularly limited as long as the anionic group can generate an anion in a dissociated state, and the anionic group may be a salt or ester of the above-mentioned anionic group.

(Polyhydroxy Compound)

In a preferred embodiment, the second conductive polymer layer further includes a polyhydroxy compound. The polyhydroxy compound may be included in the first conductive polymer layer, but when the polyhydroxy compound is locally present in the second conductive polymer layer, and is not present, or is present at a low concentration in the first conductive polymer layer, deterioration of the dielectric layer is suppressed, a leakage current is reduced, and the voltage resistance characteristic is easily improved.

The polyhydroxy compound should have two or more hydroxy groups, and the hydroxy group may be any of an alcoholic hydroxy group and a phenolic hydroxy group. As the polyhydroxy compound, for example, an alkylene glycol such as diethylene glycol or triethylene glycol, or a glycerin such as glycerin, diglycerin, or triglycerin may be used.

When a polyhydroxy compound having a melting point ranging from 40° C. to 150° C., inclusive, is used, an effect of enhancing crystallinity of the conductive polymer, improving the conductivity, and reducing ESR can be obtained. When the polyhydroxy compound has such a melting point, stress on the dielectric layer in exposure of the electrolytic capacitor to a high temperature can be further decreased, so that damage to fine structures formed by roughing a surface of the anode body can be reduced.

Preferably, the polyhydroxy compound has a boiling point of 300° C. or lower. When the polyhydroxy compound has such a boiling point, the polyhydroxy compound moderately volatilizes during formation of the conductive polymer layer, and therefore reflow resistance of the electrolytic capacitor is improved. It is considered that the polyhydroxy compound moderately remains in the conductive polymer layer, and therefore crystallinity of the conductive polymer is further enhanced.

The polyhydroxy compound should have at least two hydroxy groups in a single molecule of the hydroxy compound. From the viewpoint of setting the melting point and the boiling point to a more preferable range, the hydroxy compound has preferably 5 or less hydroxy groups, more preferably 4 or less hydroxy groups, further preferably 2 or 3.

The polyhydroxy compound has a melting point ranging from 40° C. to 150° C., inclusive. In terms of allowing the polyhydroxy compound to maintain a solid state, however, the hydroxy compound has a melting point of preferably 50° C. or higher, and more preferably 55° C. or higher. In addition, in terms of facilitating liquefaction of the polyhydroxy compound that is exposed to a thermal atmosphere and increasing an effect of improving the crystallinity of the conductive polymer, the polyhydroxy compound has a melting point of preferably 130° C. or lower, and more preferably 110° C. or lower. The polyhydroxy compound should have a boiling point of 300° C. or lower, and may have 250° C. or lower.

Examples of the polyhydroxy compound having a melting point as described above include erythritol, neopentyl glycol, catechol, xylitol, trimethylolpropane, sorbitol, pyrogallol, pinacol, and 2,5-hexanediol. These polyanions may be used alone or in combination of two or more polyanions. Among these hydroxy compounds, neopentyl glycol, 2,5-hexanediol, catechol, and trimethylolpropane are preferred, for example.

A ratio of the polyhydroxy compound included in the second conductive polymer layer is preferably from 5 parts by mass to 200 parts by mass, inclusive, more preferably from 10 parts by mass to 100 parts by mass, inclusive, with respect to 100 parts by mass of the second conductive polymer.

When the first conductive polymer layer and the second conductive polymer layer each include a polyhydroxy compound, a concentration of the polyhydroxy compound included in the first conductive polymer layer is preferably lower than a concentration of the polyhydroxy compound included in the second conductive polymer layer. Concentrations of the polyhydroxy compound in the layers may be compared based on relative amounts of the polyhydroxy compound with respect to the conductive polymer included in the layers.

A ratio of the polyhydroxy compound included in the first conductive polymer layer is preferably 200 parts by mass or less, more preferably 50 parts by mass with respect to 100 parts by mass of the first conductive polymer.

(Basic Compound)

Preferably, the first conductive polymer layer and/or the second conductive polymer layer further include(s) a basic compound. When the basic compound is included, de-doping of the dopant is suppressed, so that reduction of conductivity of the conductive polymer layer can be suppressed, leading to further improvement of the effect of reducing ESR.

Examples of the basic compound include inorganic bases such as ammonia, and organic bases such as amines. Among the basic compounds, amines are preferable because a high effect of suppressing of reduction of conductivity is obtained. The amine may be any of a primary amine, a secondary amine and a tertiary amine. Examples of the amine also include aliphatic amines such as diethylamine, and cyclic amines. The basic compounds may be used alone or in combination of two or more basic compounds.

For easily reducing ESR, a ratio of the basic compound in each of the first conductive polymer layer and the second conductive polymer layer is preferably from 5 parts by mass to 200 parts by mass, inclusive, or from 10 parts by mass to 100 parts by mass, inclusive, with respect to 100 parts by mass of the conductive polymer.

(Water-soluble Compound)

The first conductive polymer layer and the second conductive polymer layer may each include a water-soluble compound for improving the voltage resistance characteristic. As the water-soluble compound, one different from all of the dopant, the polycarboxylic acid, the polyhydroxy compound, and the basic compound is used.

Examples of the water-soluble compound include compounds having an oxyalkylene group or a polyoxyalkylene group, and water-soluble resins. Examples of the water-soluble resin include polyvinyl alcohols, polyacrylic acids, and cellulose ethers such as hydroxyethyl cellulose. The water-soluble compounds may be used alone or in combination of two or more water-soluble compounds.

As the water-soluble compound, water-soluble resins, and compounds having a high molecular weight among compounds having an oxyalkylene group, for example, polyethylene glycol and ethers of such compounds are preferable. Preferably, a water-soluble polymer (first water-soluble polymer) included in the first conductive polymer layer is different from the first dopant, and a water-soluble polymer (second water-soluble polymer) included in the second conductive polymer layer is different from the second dopant.

For further improving the voltage resistance characteristic, a ratio of the water-soluble compound contained in each of the first conductive polymer layer and the second conductive polymer layer is preferably from 5 parts by mass to 200 parts by mass, inclusive, or from 10 parts by mass to 100 parts by mass, inclusive, with respect to 100 parts by mass of the conductive polymer.

(Others)

An average thickness of the second conductive polymer layer ranges, for example, from 5 μm to 100 μm, inclusive, preferably from 10 μm to 50 μm, inclusive. A ratio of the average thickness of the second conductive polymer layer to the average thickness of the first conductive polymer layer is, for example, 5 times or more, preferably 10 times or more. When the average thickness and the ratio of the average thickness fall within such a range, strength of the conductive polymer layer as a whole can be increased.

As described above, the average thickness of the second conductive polymer layer is larger than the average thickness of the first conductive polymer layer, so that resistance tends to increase. Thus, by using a polycarboxylic acid in the second conductive polymer layer, the effect of reducing ESR or suppressing a leakage current is easily exhibited.

While described in the above exemplary embodiment is a case where the capacitor element has a two-layered conductive polymer layer of the first conductive polymer layer and the second conductive polymer layer, the first conductive polymer layer and the second conductive polymer layer each may include one layer, or a plurality of layers.

Each of the first conductive polymer layer and the second conductive polymer layer may further include a publicly known additive, and/or a publicly known conductive material (e.g., a conductive inorganic material such as manganese dioxide; and/or a TCNQ complex salt) other than the conductive polymer, as required. A layer to enhance adhesion may be interposed between the dielectric layer and the conductive polymer layer or between the first conductive polymer layer and the second conductive polymer layer.

(Cathode Layer)

The carbon layer is satisfactory as long as the carbon layer has conductivity, and the carbon layer can be configured, for example, with use of a conductive carbon material such as graphite. For the silver paste layer, for example, there can be used a composition including a silver powder and a binder resin (e.g., an epoxy resin). The cathode layer is not limited to this configuration and is satisfactory as long as the cathode layer is configured to have a function of power collection. The anode terminal and the cathode terminal can be configured to include, for example, a metal such as copper or a copper alloy. As a material of the resin outer packing, there can be used, for example, an epoxy resin.

The electrolytic capacitor of the present disclosure is not limited to the electrolytic capacitor having the structure described above, and can be various electrolytic capacitors. Specifically, the present disclosure can also be applied to, for example, a wound electrolytic capacitor and an electrolytic capacitor including a metal powder sintered body as the anode body.

<Method for Producing Electrolytic Capacitor>

An electrolytic capacitor can be produced through following four steps. A first step is preparing an anode body. A second step is forming a dielectric layer on the anode body. A third step is forming a first conductive polymer layer so as to cover at least a part of the dielectric layer. And a fourth step is forming a second conductive polymer layer so as to cover at least a part of the first conductive polymer layer. The method for producing an electrolytic capacitor may further include a step (fifth step) of forming a cathode layer. Hereinafter, the steps are described in more detail.

(First Step)

In the first step, an anode body is formed by a publicly known method according to a kind of the anode body. The anode body can be prepared by, for example, roughening a surface of a foil-like or plate-like base material formed of a conductive material. The roughening is satisfactory as long as irregularities are formed on the surface of the base material and may be performed, for example, by subjecting the surface of the base material to etching (e.g., electrolytic etching) or by depositing particles of the conductive material on the surface of the base material by use of a gas phase method such as vapor deposition.

(Second Step)

In the second step, a dielectric layer is formed on the anode body. The dielectric layer is formed by anodizing a surface of the anode body. The anodization can be performed by a publicly known method, for example, an anodizing treatment. The anodizing treatment can be performed by, for example, immersing the anode body in an anodizing liquid to impregnate, with the anodizing liquid, the surface (a more inside surface, i.e., an inner wall surface of pores or pits) of the anode body, and applying a voltage between the anode body as an anode and a cathode immersed in the anodizing liquid. As the anodizing liquid, it is preferred to use, for example, an aqueous solution of phosphoric acid, an aqueous solution of ammonium phosphate, or an aqueous solution of ammonium adipate.

(Third Step)

In the third step, the first conductive polymer layer can be formed by use of a first treatment liquid containing a first conductive polymer and a first dopant. In the third step, for example, the dielectric layer-formed anode body is immersed in the first treatment liquid or the first treatment liquid is added dropwise to the dielectric layer-formed anode body. The first treatment liquid is impregnated by the immersion or the dropwise addition, into the surface (a more inside surface, i.e., an inner wall surface of pores or pits on which the dielectric layer has been formed) of the dielectric layer-formed anode body. After impregnating with the first treatment liquid, the anode body may be dried as required. During the drying, the anode body may be heated as required. The third step allows the conductive polymer and the first dopant to adhere to the surface of the dielectric layer-formed anode body, thus forming the first conductive polymer layer.

In a preferred exemplary embodiment, a conductive polymer dispersion is used as the first treatment liquid. The conductive polymer dispersion contains the first conductive polymer, the first dopant, and a solvent (second solvent). Use of such a conductive polymer dispersion enables easy formation of the first conductive polymer layer and easy acquisition of the first conductive polymer layer stable in quality.

Examples of the second solvent include water, an organic solvent, and a mixture of water and an organic solvent. Examples of the organic solvent include aliphatic alcohols having 1 to 5 carbon atoms (e.g., aliphatic monools such as methanol, ethanol, propanol, and 1-butanol; and aliphatic polyols such as ethylene glycol and glycerol); aliphatic ketones such as acetone; nitriles such as acetonitrile and benzonitrile; amides such as N,N-dimethylformamide; and/or sulfoxides such as dimethyl sulfoxide. As the second solvent, one solvent may be used alone, or two or more solvents may be used in combination.

The first conductive polymer and/or the first dopant dispersed in the conductive polymer dispersion is preferably particles (or a powder). An average particle size of the particles dispersed in the dispersion preferably ranges from 5 nm to 500 nm, inclusive. The average particle size can be determined, for example, from a particle size distribution obtained by a dynamic light scattering method.

The conductive polymer dispersion can be obtained by dispersing the first conductive polymer and the first dopant in a solvent. Alternatively, as the conductive polymer dispersion, there may be used a dispersion (dispersion a) obtained by removing impurities from a polymerization liquid of the first conductive polymer and then mixing the first dopant with the polymerization liquid, or a dispersion (dispersion b) obtained by removing impurities from a polymerization liquid formed through polymerization of the first conductive polymer in the presence of the first dopant. In using such a dispersion, those exemplified for the second solvent may be used as a solvent (first solvent) during the polymerization, or the second solvent may be added when impurities are removed. The second solvent may further be added to the dispersion a and the dispersion b. The conductive polymer dispersion may contain a publicly known additive as required.

When the first conductive polymer layer contains a polycarboxylic acid, a polyhydroxy compound, an amine, and/or a water-soluble compound, etc., the first conductive polymer layer may be formed by use of the first treatment liquid containing these components. The anode body may be treated with the first treatment liquid containing the first conductive polymer and the first dopant, and then treated with another treatment liquid (treatment liquid A) containing a polycarboxylic acid, a polyhydroxy compound, an amine and/or a water-soluble compound. When two or more of these components are used, treatment liquid A containing the plurality of components may be used, or a plurality of treatment liquids A containing the components, respectively, may be used.

(Fourth Step)

The fourth step can be performed in a manner similar to that in the third step or by a procedure similar to that of the third step except for using the anode body treated with the first treatment liquid, and using a second treatment liquid containing the second conductive polymer and the second dopant in place of the first treatment liquid. As the second treatment liquid, it is possible to use a treatment liquid similar to the first treatment liquid except for using the second conductive polymer in place of the first conductive polymer and using the second dopant in place of the first dopant.

The polycarboxylic acid may be added to the second treatment liquid as in a case of the third step, or the anode body may be treated with the second treatment liquid, and then treated with another treatment liquid (treatment liquid B) containing a polycarboxylic acid to form the second conductive polymer layer.

When the second conductive polymer layer contains a polyhydroxy compound, an amine and/or a water-soluble compound, the polycarboxylic acid may be added to the second treatment liquid, or to treatment liquid B. The anode body may be treated with the second treatment liquid, or the second treatment liquid and treatment liquid B, and then treated with treatment liquid C containing a polyhydroxy compound, an amine and/or a water-soluble compound to include these components in the second conductive polymer layer. When two or more of these components are used, treatment liquid C containing the plurality of components may be used, or a plurality of treatment liquids C containing the components, respectively, may be used.

(Fifth Step)

In the fifth step, a cathode layer is formed by sequentially stacking a carbon layer and a silver paste layer on the surface (preferably of the conductive polymer layer formed) of the anode body obtained in the fourth step.

EXAMPLES

Hereinafter, the present disclosure is specifically described with reference to examples and comparative examples. The present disclosure, however, is not limited to the examples below.

Example 1

Electrolytic capacitor 1 shown in FIG. 1 was produced in the manner described below, and characteristics of the electrolytic capacitor were evaluated.

(1) Step of Preparing Anode Body 2 (First Step)

Both surfaces of an aluminum foil (thickness: 100 µm) as a base material were roughened by etching to produce anode body 2.

(2) Step of Forming Dielectric Layer 3 (Second Step)

A part on one end side of anode body 2 (a part from a separation portion to the one end) was immersed in an anodizing liquid, and a 70 V DC voltage was applied for 20 minutes to form dielectric layer 3 including aluminum oxide.

(3) Step of Forming First Conductive Polymer Layer 4a (Third Step)

A 3,4-ethylenedioxythiophene monomer was added under stirring to an aqueous solution containing polystyrene sulfonic acid (sulfonation degree: 100 mol %), and then oxidants (iron(III) sulfate and sodium persulfate) were added to the resulting mixture to carry out chemical oxidation polymerization. The resulting polymerization liquid was subjected to filtration by ion-exchange equipment to remove impurities. Thus, a solution which contained poly(3,4-ethylenedioxythiophene) (PEDOT) as a first conductive polymer, and polystyrene sulfonic acid (PSS) as a first polymer dopant was obtained.

Pure water was added to the obtained solution, and the resulting mixture was homogenized by a high-pressure homogenizer and was further subjected to filtration by a filter to prepare a first treatment liquid in a state of a dispersion liquid. Anode body 2, on which dielectric layer 3 obtained in the above step (2) was formed, was immersed in the first treatment liquid, then taken out from the first treatment liquid, and further dried at 120° C. for a period ranging from 10 minutes to 30 minutes. The immersion in the first treatment liquid and the drying were repeated again, so that first conductive polymer layer 4a was formed so as to cover a surface of dielectric layer 3. An average thickness of first conductive polymer layer 4a measured by a scanning electron microscope (SEM) was about 1 µm.

(4) Step of Forming Second Conductive Polymer Layer 4b (Fourth Step)

In a manner similar to that in the above step (3), a solution that contained poly(3,4-ethylenedioxythiophene) (PEDOT) as a second conductive polymer and polystyrene sulfonic acid (PSS) as a second polymer dopant was obtained. Pure water and citric acid were added to the obtained solution, and the resulting mixture was homogenized by a high-pressure homogenizer and was further subjected to filtration by a filter to prepare a second treatment liquid in a state of a dispersion liquid. A ratio of citric acid was 50 parts by mass with respect to 100 parts by mass of poly(3,4-ethylenedioxythiophene) (PEDOT).

Anode body 2 treated in the above step (3) was immersed in the second treatment liquid, was taken out from the second treatment liquid, and further dried at 120° C. for a period ranging from 10 minutes to 30 minutes. The immersion in the second treatment liquid and the drying were alternately repeated twice, so that second conductive polymer layer 4b was formed so as to cover a surface of first conductive polymer layer 4a. An average thickness of second conductive polymer layer 4b was measured in a manner similar to that as in the case of first conductive polymer layer 4a, and consequently the average thickness was about 30 µm. Thus, first conductive polymer layer 4a and second conductive polymer layer 4b were formed so as to cover the surface of dielectric layer 3.

(5) Step of Forming Cathode Layer 5 (Fifth Step)

Anode body 2 obtained in the above step (4) was immersed in a dispersion liquid in which graphite particles were dispersed in water, was taken out from the dispersion liquid, and was dried to form carbon layer 5a on at least a surface of second conductive polymer layer 4b. Drying was carried out at a temperature ranging from 130° C. to 180° C. for a period ranging from 10 minutes to 30 minutes. Then, a silver paste containing silver particles and a binder resin (epoxy resin) was applied onto a surface of carbon layer 5a, and the layer coated with the silver paste was heated at a temperature ranging from 150° C. to 200° C. for a period ranging from 10 minutes to 60 minutes to cure the binder resin, so that silver paste layer 5b was formed. Thus, cathode layer 5 composed of carbon layer 5a and silver paste layer 5b was formed. As described above, capacitor element 11 was produced.

(6) Assembling of Electrolytic Capacitor

Cathode layer 5 of capacitor element 11, obtained in the above step (5), was joined with one end (first end) 14a of cathode terminal 14 by conductive adhesive 17. The other end of anode body 2, which protruded from capacitor element 11, was joined with one end (first end) 13a of anode terminal 13 by laser welding. Next, resin outer packing 12 formed of an insulating resin was formed around capacitor element 11 by a transfer molding method. Then, the other end (second end) 13b of anode terminal 13 and the other end (second end) 14b of cathode terminal 14 were in a state of being drawn out from resin outer packing 12. Thus, electrolytic capacitor 1 was completed. In a manner similar to that described above, a total of 250 electrolytic capacitors 1 were produced.

(7) Evaluation

The following evaluations were performed using an electrolytic capacitor. The electrostatic capacities, the ESR values and the moisture resistances were measured for each randomly selected 120 electrolytic capacitors, and average values for the electrostatic capacities, the ESR values and the moisture resistances were calculated.

(a) Electrostatic Capacity and ESR

An electrostatic capacity (initial electrostatic capacity) (μF) at a frequency of 120 Hz was measured for the electrolytic capacitor using an LCR meter for four-terminal measurement. An ESR value (initial ESR value) (mΩ) at a frequency of 100 kHz was measured for the electrolytic capacitor using an LCR meter for 4-terminal measurement.

(b) Leakage Current (LC)

A voltage of 10 V was applied between anode body 2 and cathode layer 5 of the electrolytic capacitor and leakage current was measured after 40 seconds of the application. Then, an electrolytic capacitor having a leakage current amount exceeding 100 μA was determined to be defective, and a ratio of defectives to electrolytic capacitors (leakage current (LC) defective ratio) (%) was calculated in each of the examples and comparative examples to take the ratio as a reference index of the leakage current.

Example 2

Except for using trimellitic acid in place of citric acid in step (4) in Example 1, a procedure similar to that in Example 1 was carried out to produce an electrolytic capacitor, and the electrolytic capacitor was evaluated.

Example 3

Except for using pyromellitic acid in place of citric acid in step (4) in Example 1, a procedure similar to that in Example 1 was carried out to produce an electrolytic capacitor, and the electrolytic capacitor was evaluated.

Example 4

Except for using phthalic acid in place of citric acid in step (4) in Example 1, a procedure similar to that in Example 1 was carried out to produce an electrolytic capacitor, and the electrolytic capacitor was evaluated.

Example 5

Except for using a solution containing poly(3,4-ethylenedioxythiophene) (PEDOT) as the second conductive polymer and a polyester having a sulfonate group as the second polymer dopant in place of the solution containing poly(3,4-ethylenedioxythiophene) (PEDOT) and polystyrene sulfonic acid (PSS) in step (4) in Example 1, a procedure similar to that in Example 1 was carried out to produce an electrolytic capacitor, and the electrolytic capacitor was evaluated.

The solution containing poly(3,4-ethylene dioxythiophene) (PEDOT) and a polyester having a sulfonate group was prepared in a manner as described below. A 3,4-ethylenedioxythiophene monomer was added under stirring to an aqueous solution of polyester having a sulfonate group (sulfonation degree: 20 mol %), and then oxidants (iron(III) sulfate and sodium persulfate) were added to the resulting mixture to carry out chemical oxidation polymerization. The resulting polymerization liquid was subjected to filtration by ion-exchange equipment to remove impurities. Thus, the above-mentioned solution was obtained.

Example 6

Except for changing the ratio of citric acid from that in step (4) in Example 1 to 10 parts by mass with respect to 100 parts by mass of poly(3,4-ethylenedioxythiophene) (PEDOT), a procedure similar to that in Example 1 was carried out to produce an electrolytic capacitor, and the electrolytic capacitor was evaluated.

Example 7

Except for changing the ratio of citric acid from that in step (4) in Example 1 to 200 parts by mass with respect to 100 parts by mass of poly(3,4-ethylenedioxythiophene) (PEDOT), a procedure similar to that in Example 1 was carried out to produce an electrolytic capacitor, and the electrolytic capacitor was evaluated.

Example 8

Pure water and citric acid were added to the solution containing poly(3,4-ethylenedioxythiophene) (PEDOT) and polystyrene sulfonic acid (PSS) in step (3) in Example 1, and the resulting mixture was homogenized by a high-pressure homogenizer, and further subjected to filtration by a filter to prepare a first treatment liquid in a state of a dispersion liquid. The ratio of citric acid was 10 parts by mass with respect to 100 parts by mass of poly(3,4-ethylenedioxythiophene) (PEDOT). Except for using the first treatment liquid thus obtained, a procedure similar to that in Example 1 was carried out to produce an electrolytic capacitor, and the electrolytic capacitor was evaluated.

Example 9

Except for changing the ratio of citric acid to 200 parts by mass with respect to 100 parts by mass of poly(3,4-ethylenedioxythiophene) (PEDOT), a procedure similar to that in Example 8 was carried out to prepare a first treatment liquid. Except for changing the ratio of citric acid from that in step (4) in Example 1 to 20 parts by mass with respect to 100 parts by mass of poly(3,4-ethylenedioxythiophene) (PEDOT), a procedure similar to that in Example 1 was carried out to prepare a second treatment liquid. Except for using the resulting first treatment liquid and second treatment liquid, a procedure similar to that in Example 1 was carried out to produce an electrolytic capacitor, and the electrolytic capacitor was evaluated.

Comparative Example 1

Except for not using a second treatment liquid, and using only a first treatment liquid prepared in a manner similar to that in Example 1 to form a conductive polymer layer, a procedure similar to that in Example 1 was carried out to an electrolytic capacitor, and the electrolytic capacitor was evaluated.

Comparative Example 2

Except changing the ratio of citric acid to 50 parts by mass with respect to 100 parts by mass of poly(3,4-ethylenedi-oxythiophene) (PEDOT), a procedure similar to that in Example 8 was carried out to prepare a first treatment liquid. A second treatment liquid was prepared in a manner similar to that in (4) in Example 1 except for not adding citric acid. Except for using the first treatment liquid and second treatment liquid thus obtained, a procedure similar to that in Example 1 was carried out to produce an electrolytic capacitor, and the electrolytic capacitor was evaluated. Table 1 shows evaluation results of Examples 1 to 9 and Comparative Examples 1 and 2. In Table 1, A1 to A9 indicate electrolytic capacitors of Examples A1 to A9, respectively, and B1 and B2 indicate electrolytic capacitors of Comparative Examples 1 and 2, respectively.

TABLE 1

|    | Electrostatic Capacity (μF) | ESR (mΩ) | LC Defectives (%) |
|----|-----------------------------|----------|-------------------|
| A1 | 3.3 | 31 | 0.1 |
| A2 | 3.3 | 33 | 0.1 |
| A3 | 3.4 | 30 | 0.2 |
| A4 | 3.1 | 51 | 1.8 |
| A5 | 3.3 | 38 | 0.3 |
| A6 | 3.1 | 45 | 1.7 |
| A7 | 3.0 | 47 | 1.5 |
| A8 | 3.3 | 29 | 0.2 |
| A9 | 2.8 | 60 | 2.7 |
| B1 | 2.8 | 64 | 4.5 |
| B2 | 2.9 | 59 | 3.4 |

As shown in Table 1, the electrolytic capacitors of Examples 1 to 8 had a higher electrostatic capacity and lower ESR as compared to the electrolytic capacitors of comparative examples. The electrolytic capacitor of Example 9 was comparable in electrostatic capacity and ESR to the electrolytic capacitor, but had reduced ESR as compared to the electrolytic capacitor of Comparative Example 1, and had a lower leakage current (LC) defective ratio and a reduced leakage current as compared to the electrolytic capacitors of Comparative Examples 1 and 2. The electrolytic capacitors of other examples had a lower leakage current (LC) defective ratio and a reduced leakage current as compared to the electrolytic capacitors of comparative examples.

The electrolytic capacitor according to the exemplary embodiment of the present disclosure can be used for various uses in which reduction of ESR and suppression of leakage current are required.

What is claimed is:

1. An electrolytic capacitor comprising:
   an anode body,
   a dielectric layer formed on the anode body,
   a first conductive polymer layer covering at least a part of the dielectric layer, and
   a second conductive polymer layer covering at least a part of the first conductive polymer layer, wherein:
   the first conductive polymer layer includes a first conductive polymer and a first dopant,
   the second conductive polymer layer includes a second conductive polymer, a second dopant and a polycarboxylic acid,
   the first conductive polymer layer further includes the polycarboxylic acid, and
   a concentration of the polycarboxylic acid included in the second conductive polymer layer is higher than a concentration of the polycarboxylic acid included in the first conductive polymer layer.

2. The electrolytic capacitor according to claim 1, wherein:
   a ratio of the polycarboxylic acid included in the first conductive polymer layer is 500 parts by mass or less with respect to 100 parts by mass of the first conductive polymer.

3. The electrolytic capacitor according to claim 1, wherein the polycarboxylic acid is at least one selected from the group consisting of an aromatic polycarboxylic acid, a cycloaliphatic polycarboxylic acid, and an aliphatic polycarboxylic acid.

4. The electrolytic capacitor according to claim 1, wherein the polycarboxylic acid has three or more carboxy groups.

5. The electrolytic capacitor according to claim 1, wherein:
   the first dopant includes a first polymer dopant having sulfonation degree $S_1$,
   the second dopant includes a second polymer dopant having sulfonation degree $S_2$, and
   the sulfonation degree $S_1$ and the sulfonation degree $S_2$ satisfy a relationship of $S_2 < S_1$.

6. The electrolytic capacitor according to claim 5, wherein the sulfonation degree $S_2$ is from 5 mol % to 55 mol %, inclusive.

7. The electrolytic capacitor according to claim 1, wherein the second conductive polymer layer further includes a polyhydroxy compound.

8. The electrolytic capacitor according to claim 1, wherein the anode body includes aluminum.

9. The electrolytic capacitor according to claim 1, wherein the polycarboxylic acid is at least one selected from the group consisting of a citric acid, a phthalic acid, a trimellitic acid, and a pyromellitic acid.

10. An electrolytic capacitor comprising:
    an anode body,
    a dielectric layer formed on the anode body,
    a first conductive polymer layer covering at least a part of the dielectric layer, and
    a second conductive polymer layer covering at least a part of the first conductive polymer layer, wherein:
    the first conductive polymer layer includes a first conductive polymer and a first dopant,
    the second conductive polymer layer includes a second conductive polymer, a second dopant and a polycarboxylic acid,
    the first conductive polymer layer further includes the polycarboxylic acid, and
    a ratio of the polycarboxylic acid included in the first conductive polymer layer is 500 parts by mass or less with respect to 100 parts by mass of the first conductive polymer.

11. The electrolytic capacitor according to claim 10, wherein the polycarboxylic acid has three or more carboxy groups.

12. The electrolytic capacitor according to claim 10, wherein the polycarboxylic acid is at least one selected from the group consisting of a citric acid, a phthalic acid, a trimellitic acid, and a pyromellitic acid.

13. An electrolytic capacitor comprising:
an anode body,
a dielectric layer formed on the anode body,
a first conductive polymer layer covering at least a part of the dielectric layer, and
a second conductive polymer layer covering at least a part of the first conductive polymer layer, wherein:
the first conductive polymer layer includes a first conductive polymer and a first dopant,
the second conductive polymer layer includes a second conductive polymer, a second dopant and a polycarboxylic acid,
the second dopant includes a second polymer dopant having sulfonation degree $S_2$, and
the sulfonation degree $S_2$ is from 5 mol % to 55 mol %, inclusive.

14. The electrolytic capacitor according to claim 13, wherein the first conductive polymer layer does not include the polycarboxylic acid.

15. The electrolytic capacitor according to claim 13, wherein the polycarboxylic acid has three or more carboxy groups.

16. The electrolytic capacitor according to claim 13, wherein the polycarboxylic acid is at least one selected from the group consisting of a citric acid, a phthalic acid, a trimellitic acid, and a pyromellitic acid.

17. An electrolytic capacitor comprising:
an anode body,
a dielectric layer formed on the anode body,
a first conductive polymer layer covering at least a part of the dielectric layer, and
a second conductive polymer layer covering at least a part of the first conductive polymer layer, wherein:
the first conductive polymer layer includes a first conductive polymer and a first dopant,
the second conductive polymer layer includes a second conductive polymer, a second dopant and an aromatic polycarboxylic acid, and
the aromatic polycarboxylic acid has three or more carboxy groups.

18. The electrolytic capacitor according to claim 17, wherein the aromatic polycarboxylic acid is at least one selected from the group consisting of a trimellitic acid, and a pyromellitic acid.

19. The electrolytic capacitor according to claim 17, wherein the first conductive polymer layer does not include the aromatic polycarboxylic acid.

* * * * *

UNITED STATES PATENT AND TRADEMARK OFFICE
CERTIFICATE OF CORRECTION

PATENT NO. : 10,319,532 B2
APPLICATION NO. : 15/812380
DATED : June 11, 2019
INVENTOR(S) : Youichirou Uka et al.

It is certified that error appears in the above-identified patent and that said Letters Patent is hereby corrected as shown below:

On the Title Page

The filing date of the related International Application should be listed as listed below:
Related U.S. Application Data
(63) Continuation of Application No. PCT/JP2016/001810, filed on March 29, 2016

Signed and Sealed this
Twelfth Day of November, 2019

Andrei Iancu
*Director of the United States Patent and Trademark Office*